May 20, 1958
S. D. POLSEN ET AL
2,835,284
DISPENSING APPARATUS
Filed Sept. 29, 1955
8 Sheets-Sheet 1
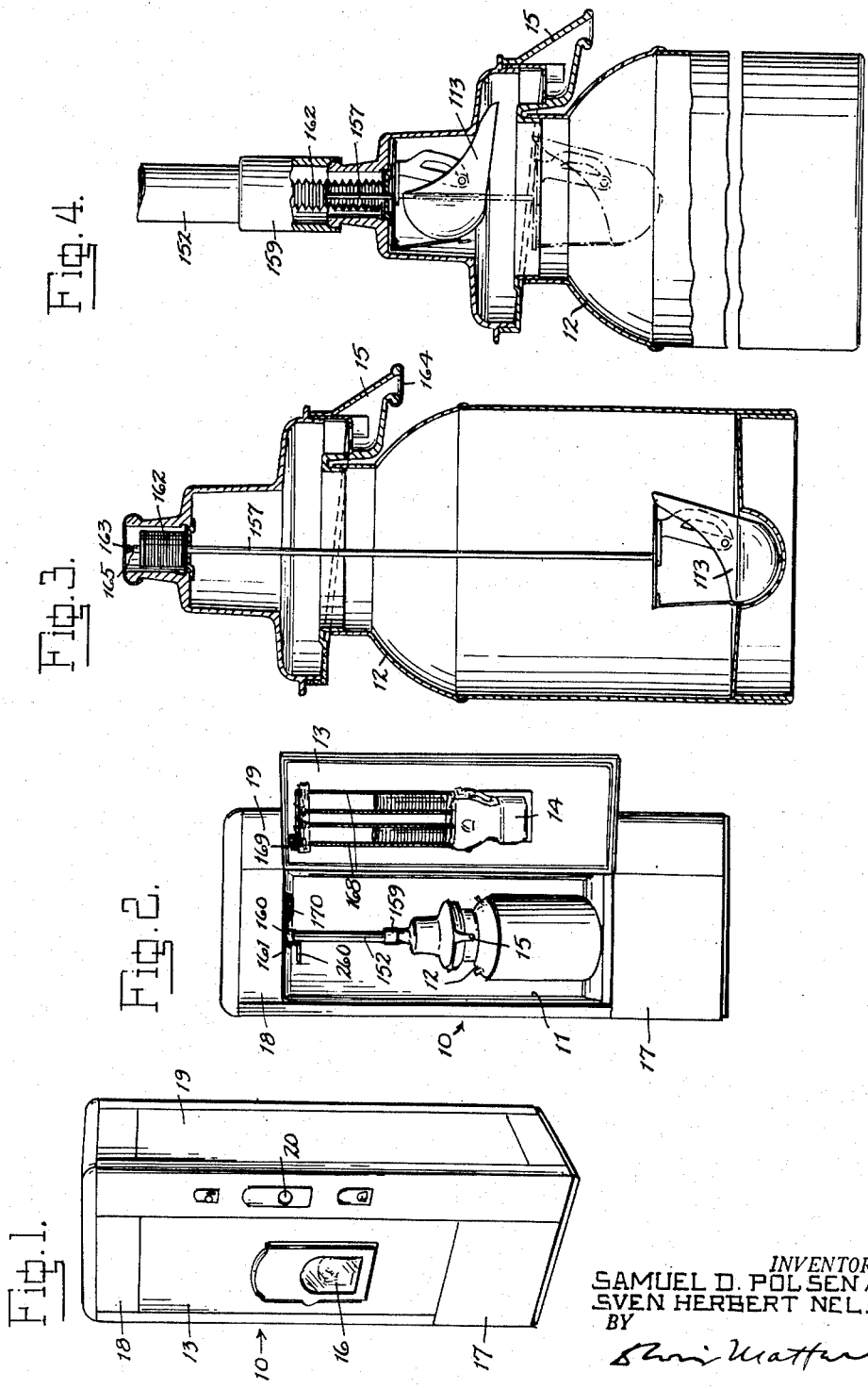
INVENTORS
SAMUEL D. POLSEN AND
SVEN HERBERT NELSON
BY
ATTORNEY.

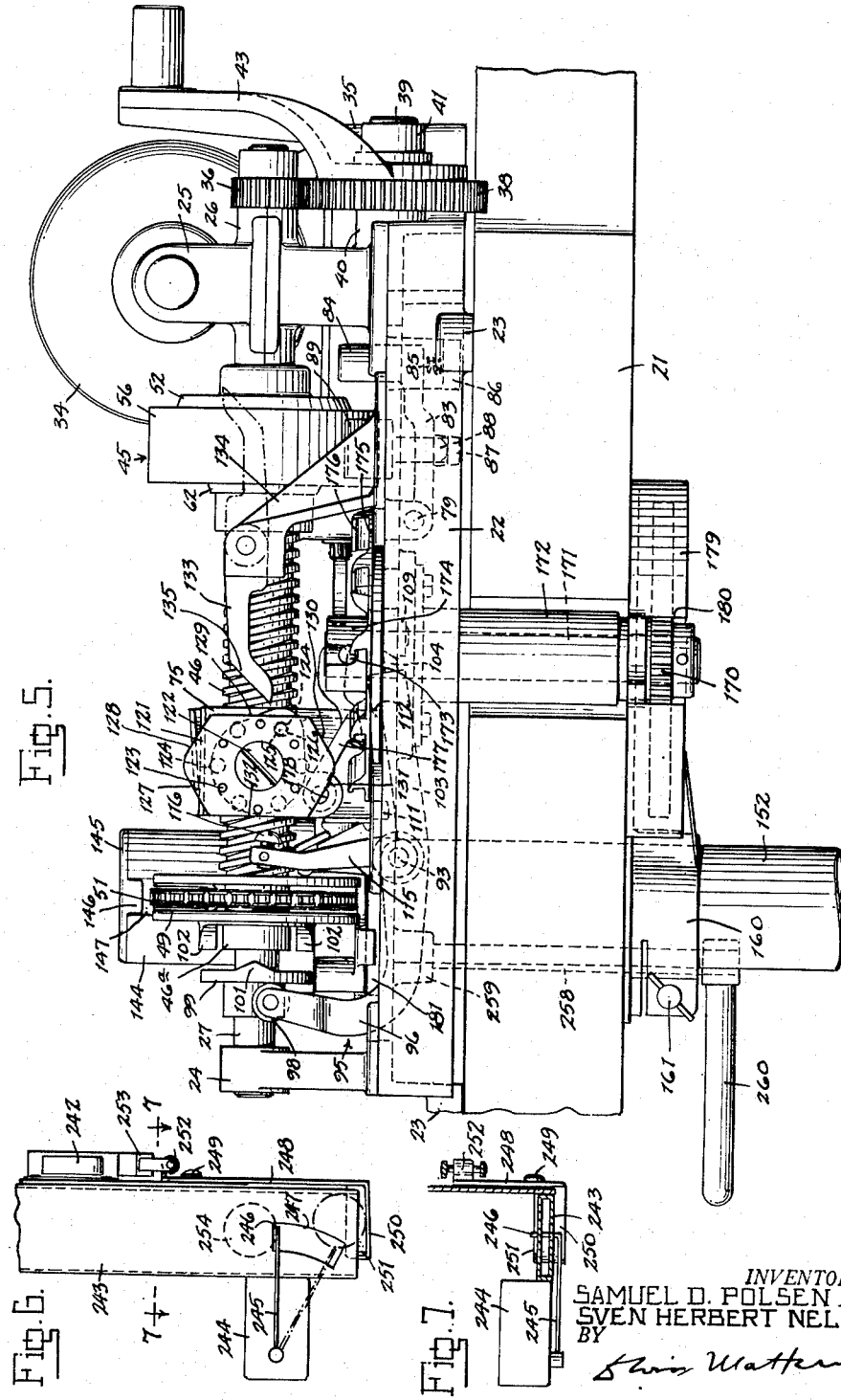

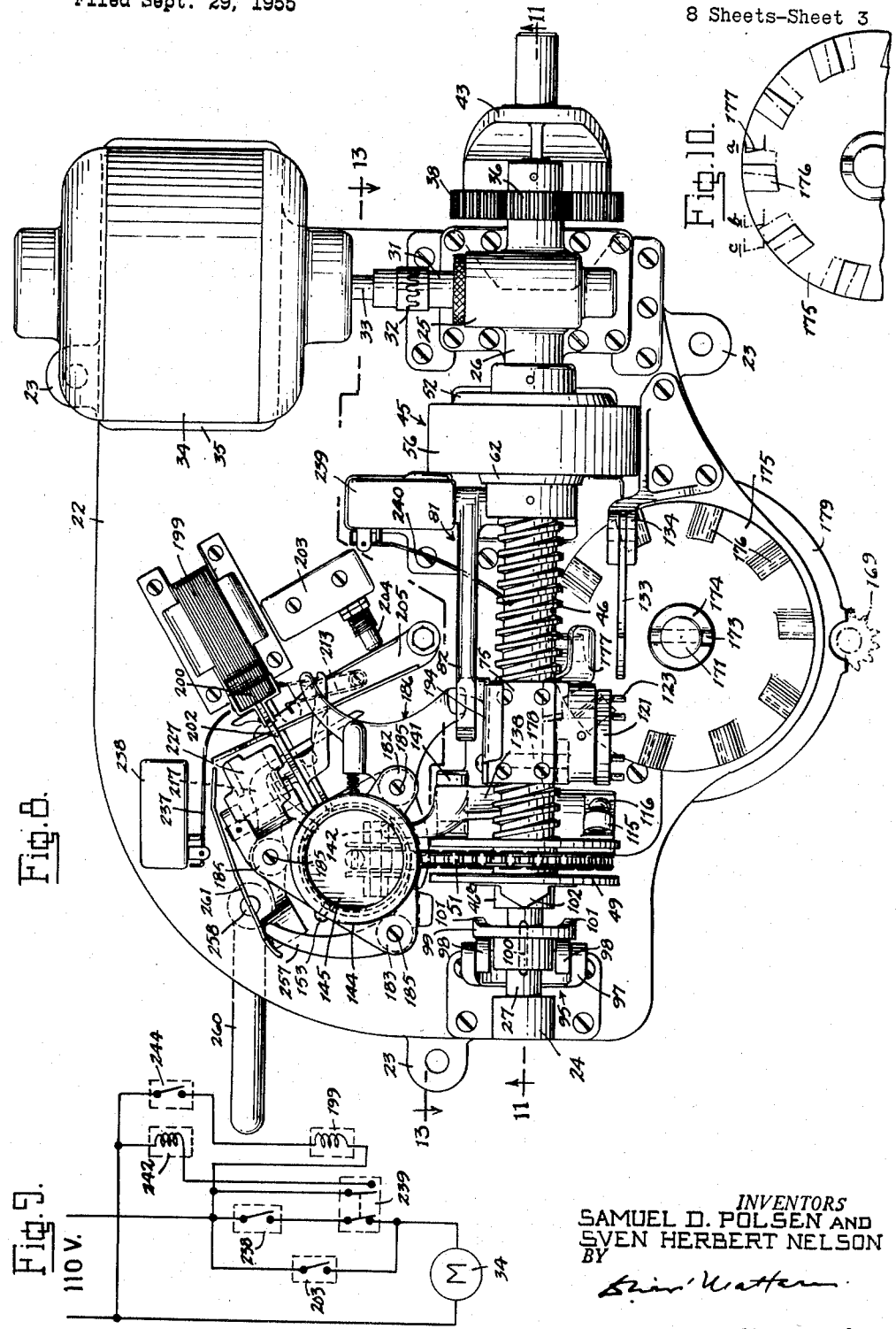

May 20, 1958  S. D. POLSEN ET AL  2,835,284
DISPENSING APPARATUS
Filed Sept. 29, 1955  8 Sheets-Sheet 4
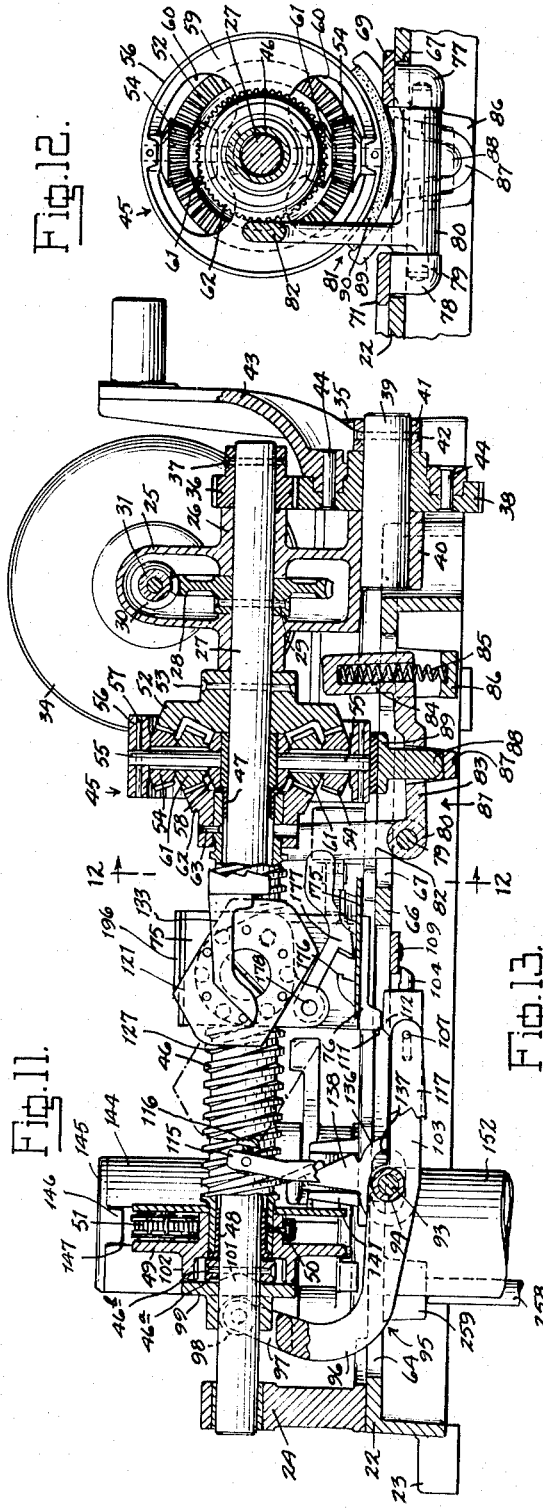
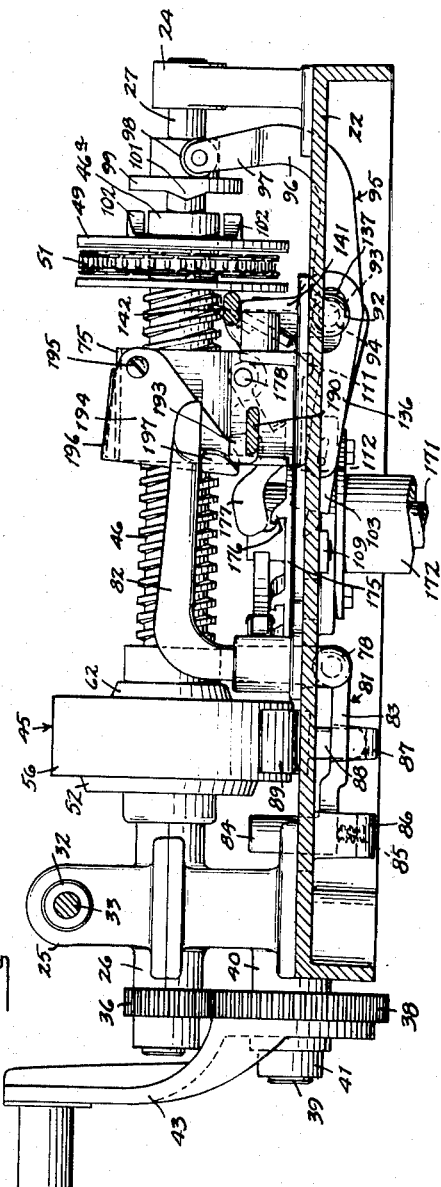
INVENTORS
SAMUEL D. POLSEN AND
SVEN HERBERT NELSON
BY
ATTORNEY.

May 20, 1958　　　S. D. POLSEN ET AL　　　2,835,284
DISPENSING APPARATUS
Filed Sept. 29, 1955　　　　　　　　　　　　8 Sheets-Sheet 5
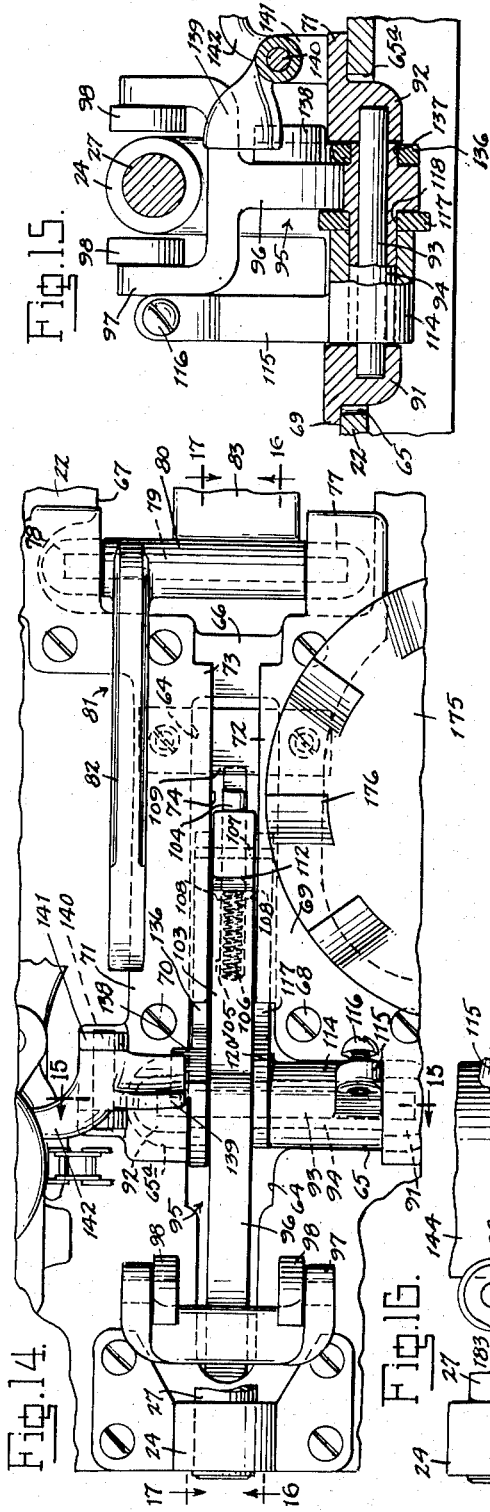
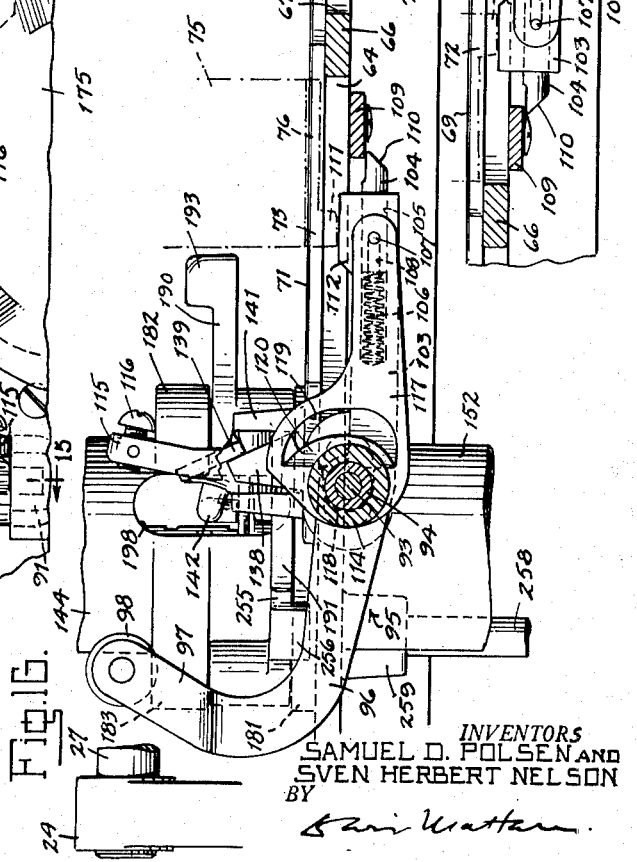
INVENTORS
SAMUEL D. POLSEN AND
SVEN HERBERT NELSON
BY
ATTORNEY.

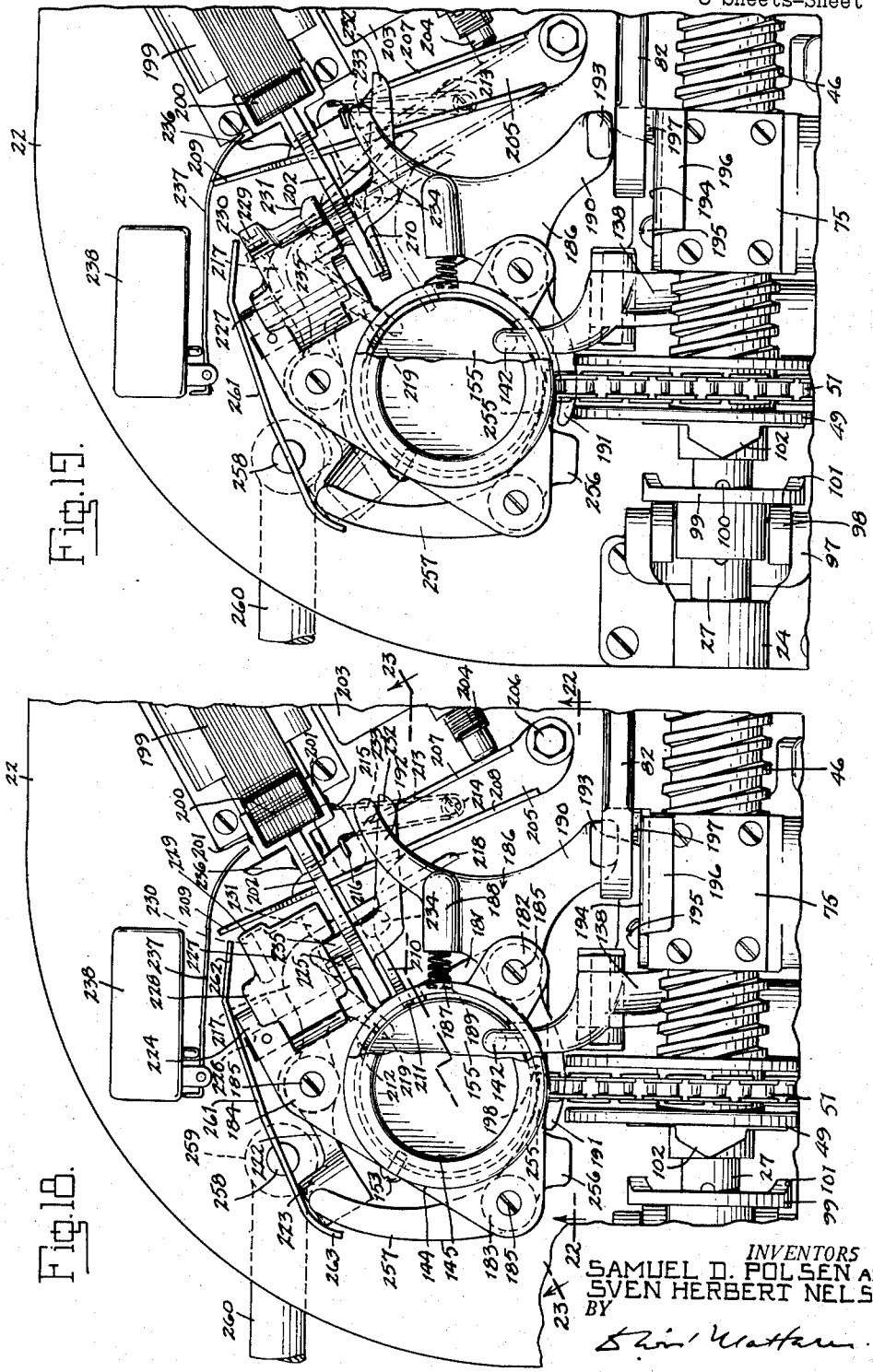

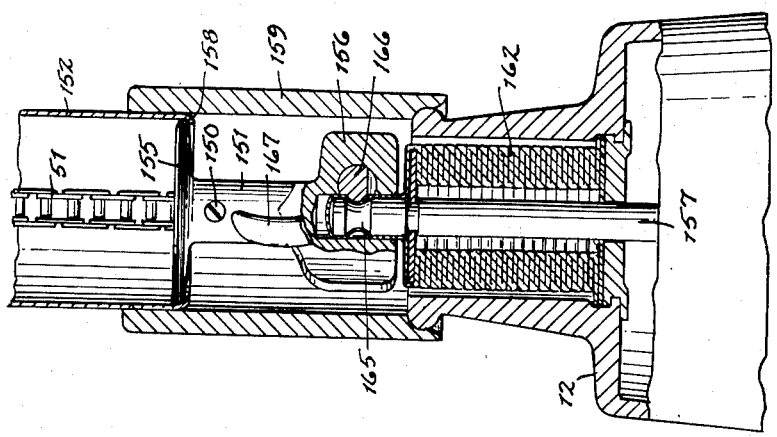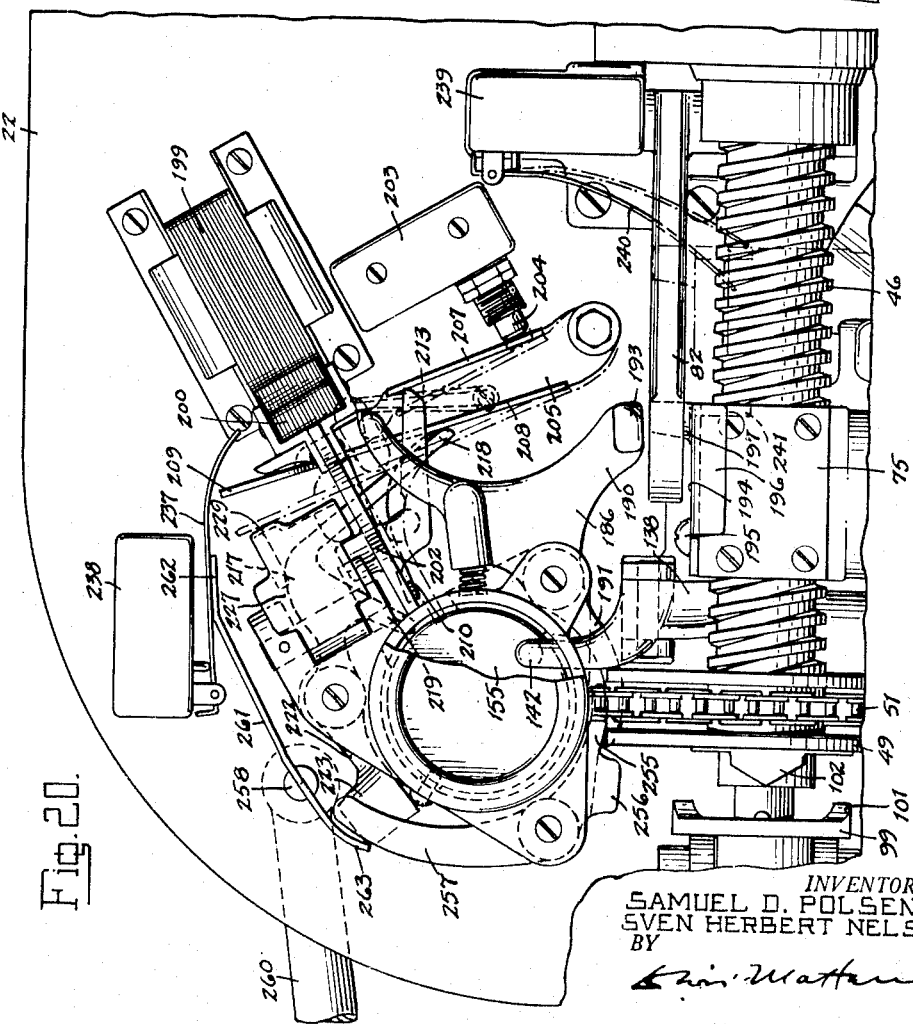

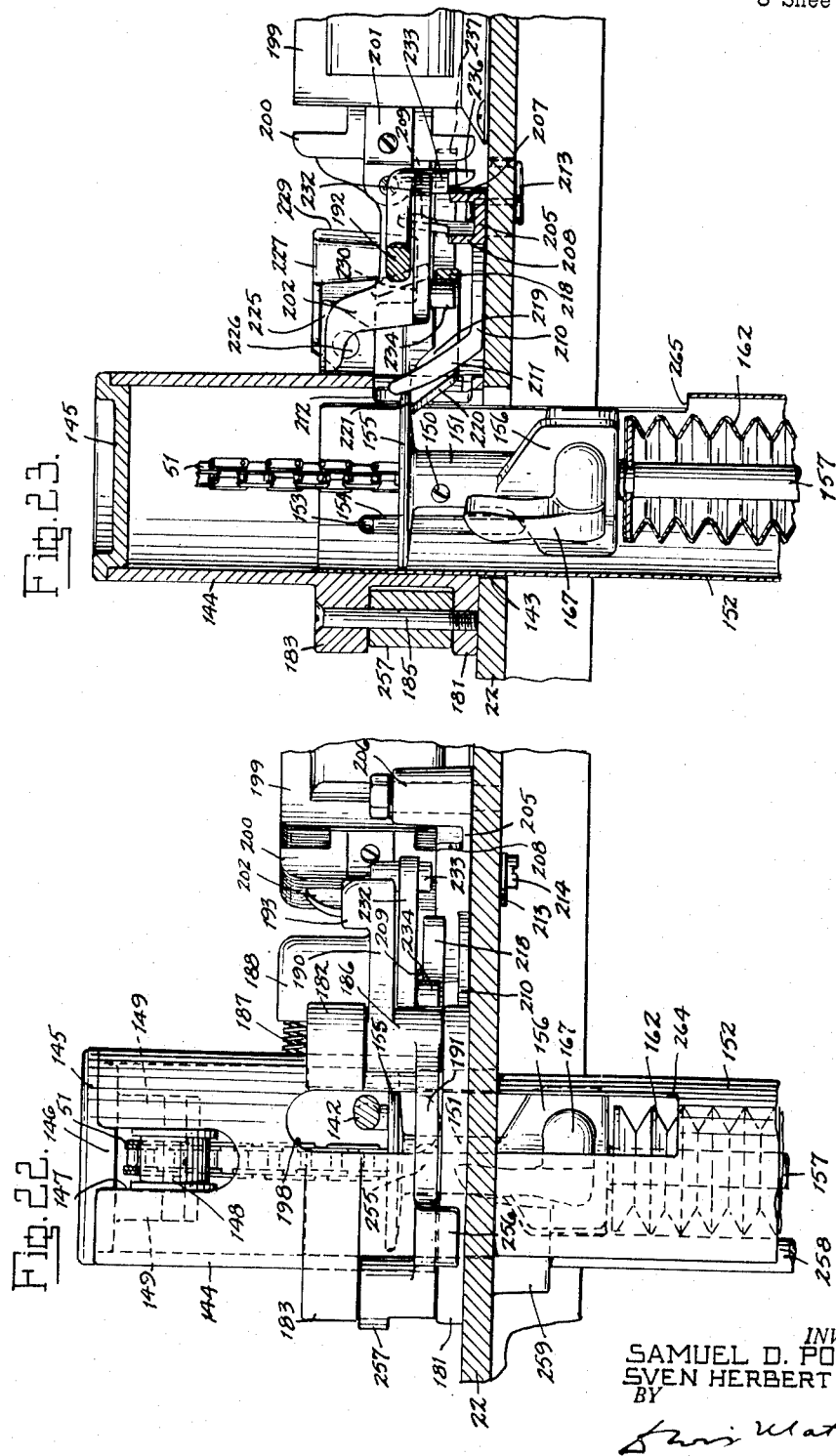

United States Patent Office 2,835,284
Patented May 20, 1958

2,835,284

DISPENSING APPARATUS

Samuel D. Polsen and Sven Herbert Nelson, Fairfield, Conn.

Application September 29, 1955, Serial No. 537,394

16 Claims. (Cl. 141—174)

The present invention relates to a dispensing apparatus, particularly for the dispensing of milk or other liquids from a container having a dipper suspended therein and adapted to be reciprocated upwardly and downwardly through the container to mix the liquid, and further adapted, in an elevated position within the container, to be tilted to pour the contents of the dipper into a dispensing means including a spout through which the liquid flows into a suitable cup or other receptacle.

The invention is specifically concerned with an improved automatic mechanism incorporated in a dispensing apparatus of the coin slot type, which is adapted through a cycle of operation initiated through the insertion of a coin to operate the dipper within the container to dispense a measured quantity of liquid, and constitutes an improvement over the dispensing apparatus disclosed in our prior Patents Nos. 2,354,348 dated July 25, 1944, for Dispensing Apparatus; 2,378,430 dated June 19, 1945, for Dispensing Apparatus; and 2,556,739 dated June 12, 1951, for Milk Agitating and Dipping Device.

An object of the invention is to provide a mechanism including means which will insure a positive initiation of the operating cycle upon insertion of a coin, as well as a positive stopping of the mechanism at the end of the cycle.

A further object is to provide a mechanism including improved means for the periodic operation of the apparatus through a partial cycle, for the purpose of removing and installing the containers of milk or other liquid, and which will not interfere with the subsequent completion of the cycle, upon initiation through the insertion of a coin, during the first dispensing operation following the installation of the container.

A further object is to provide a mechanism including means operated during each cycle to actuate a cup dispensing device to feed a cup into place to receive the measured quantity of liquid from the container, and means operated during each cycle to actuate a cup crushing device into which used cups are deposited.

Other objects and advantages of the invention will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

Fig. 1 is a perspective view of a dispensing machine of the type in which the present invention is incorporated, the same being shown in its normal condition with the door closed;

Fig. 2 is a similar view showing the door open;

Fig. 3 is a vertical sectional view of a liquid container of the type with which the mechanism of the invention is adapted to cooperate, the dipper being shown in its lower position in the container, and the container being shown in the sealed condition in which it is delivered for installation in the dispensing apparatus;

Fig. 4 is a vertical sectional view, similar to Fig. 1, with parts broken away, and showing the dipper in its elevated dispensing position to which it is raised by the mechanism of the invention at the end of the dispensing cycle, the dot-and-dash lines indicating the raised position of the dipper during vertical reciprocatory milk agitating movements thereof which take place during the dispensing cycle prior to the dispensing of the liquid;

Fig. 5 is a front elevation of the dispensing mechanism, the parts being shown in the normal stopped position at the beginning or end of a dispensing cycle;

Fig. 6 is a fragmentary front elevation of the coin operated switch means for initiating operation of the dispensing cycle of the mechanism;

Fig. 7 is a horizontal sectional view taken along the line 7—7 of Fig. 6;

Fig. 8 is a top plan view of the mechanism with the parts in the same position as shown in Fig. 5;

Fig. 9 is a diagrammatic layout of the electrical circuit of the mechanism;

Fig. 10 is a fragmentary view of the cup dispensing dial of the mechanism, the dot-and-dash lines showing operative positions thereof;

Fig. 10 is a fragmentary view of the cup dispensing dial of the mechanism, the dot-and-dash lines showing operative positions thereof;

Fig. 11 is a longitudinal vertical sectional view taken along the line 11—11 of Fig. 8, but showing the parts in a different operating position; i. e., at the end of a downward movement of the dipper;

Fig. 12 is a vertical transverse sectional view taken along the line 12—12 of Fig. 11;

Fig. 13 is a longitudinal vertical sectional view taken along the line 13—13 of Fig. 8;

Fig. 14 is a fragmentary plan view, on an enlarged scale, showing the clutch actuating mechanism, the same being shown in the position in which the clutch is engaged;

Fig. 15 is a vertical transverse sectional view taken along the line 15—15 of Fig. 14;

Fig. 16 is a longitudinal vertical sectional view taken along the line 16—16 of Fig. 14;

Fig. 17 is a longitudinal vertical sectional view taken along the line 17—17 of Fig. 14;

Fig. 18 is a fragmentary top plan view, on an enlarged scale, and showing the start and stop mechanism in the normal stop position at the beginning or end of a dispensing cycle;

Fig. 19 is a similar view and showing the parts as they are actuated at the beginning of a cycle through the insertion of a coin, the dot-and-dash lines indicating the position to which the parts move when the coin is released, and remain as operation of the cycle continues;

Fig. 20 is a similar view showing the start and stop mechanism as actuated to operate the machine through a partial cycle when removing or installing a liquid container in the apparatus;

Fig. 21 is a vertical sectional view, on an enlarged scale, showing the connection of the mechanism to the dipper rod of the container, the rod being in its lowered position in the container;

Fig. 22 is a vertical sectional view taken along the line 22—22 of Fig. 18; and

Fig. 23 is a vertical sectional view taken along the line 23—23 of Fig. 18.

Referring to the drawings, and more particularly to Figs. 1 and 2 thereof, the automatic mechanism of the invention is adapted to be incorporated in a coin slot vending machine of the type consisting of a refrigerator cabinet 10, having a compartment 11 in which a liquid container 12 is placed, and which compartment is normally closed by a hinged door 13. A cup dispensing unit 14 is mounted on the door in such relation that in the closed position of the door the spout 15 of the container engages within the cup dispensing unit, so that upon cycling of the machine to dispense a measured quantity of liquid, as for instance, milk, such measured quantity is directed from the spout into a cup disposed within the cup dispensing unit, the filled cup being accessible to the patron of the machine from the outer side of the door through a window 16, normally closed, but adapted to be raised for removing the cup.

The liquid container is preferably of the type as disclosed in our co-pending patent application for Dispensing Apparatus, Serial Number 501,559, filed April 15, 1955, and the cup dispensing unit is preferably of the type as disclosed in our co-pending patent application for Cup Dispensing Apparatus, Serial Number 504,788, filed April 29, 1955.

Within the lower portion 17 of the cabinet there is provided suitable refrigerating means, in the case of a cold liquid such as milk, or suitable heating means, in the case of a hot liquid such as soup. In the upper part 18 of the cabinet the automatic mechanism of the invention is housed in relation to actuate the liquid dispensing dipper within the container and the cup dispensing unit 14, as will hereinafter more fully appear. Within a vertically disposed compartment 19 of the cabinet, at one side of the container compartment 11, there is housed a used cup receiving and packing device, which is also adapted to be operated by the mechanism of the invention, as will hereinafter more fully appear, this device being preferably of the type disclosed in our patent for Used Cup Packing Means, No. 2,700,333, granted January 25, 1955. The used cups are deposited into this device through a suitable opening 20 in the forward side of the cabinet.

Within the upper part 18 of the cabinet there is provided a suitable supporting platform or frame 21, upon which the automatic mechanism is mounted, this mechanism comprising a horizontally disposed base 22 recessed at its underside and provided at suitable points upon its peripheral wall with attaching lugs 23 for securing the base to the frame 21.

At the left hand end of the base, as seen from the forward side, there is mounted a bearing standard 24, and at the right hand end there is mounted a gear housing 25 preferably formed of a lower and an upper part joined along a horizontal central plane and having a longitudinal bearing 26 in axial line with the bearing standard 24, a longitudinal drive shaft 27 being journaled in the bearings 24 and 26. Within the housing 25 a worm gear 28 is secured to the shaft 27 by means of a pin 29 and is in mesh with a worm pinion 30 secured upon a transverse horizontal shaft 31 journalled in the upper part of the housing 25 and connected by a flexible coupling 32 to the shaft 33 of the driving motor 34, the latter being mounted upon a raised platform portion 35 of the base 22. The motor is of the non-reversing type and during the operative cycle of the mechanism it drives the shaft 27 in one direction, i. e., counter-clockwise.

Upon the end of the shaft 27, adjacent the outer end of the bearing 26, a spur gear 36 is secured by a pin 37 and meshes with a larger diameter spur gear 38 engaged for free rotation upon a stud shaft 39 mounted in a mounting sleeve portion 40 provided upon the lower side of the gear housing 25, the gear 38 being retained upon the shaft by a collar 41 secured by a pin 42 to the stud shaft. A crank arm 43 is rigidly secured by pins 44 to the gear 38 so that during an operative cycle of the mechanism the crank arm is rotated. This crank arm is connected to the used cup crushing device housed in the compartment 19 of the cabinet, this crushing device being operated to crush the used cups through rotation of the crank arm. As above pointed out, this cup crushing device is preferably of the type disclosed in our Patent No. 2,700,333, and as the present invention is not concerned with the details of this cup crushing mechanism, further illustration and description thereof is not deemed necessary.

Adjacent the inner end of the bearing 26 of the gear housing 25 there is provided a reversing gear unit, indicated generally as 45, which is connected at one end to the shaft 27 and at its other end to one end of a lead screw 46 journalled for free turning movement on the shaft 27 upon flanged end bearing bushings 47 and 48, a retaining collar 46a being secured to the shaft by a pin 46b adjacent the outer end of the bushing 48.

Upon the end of the lead screw, opposite from the end secured to the reverse gear, a chain winding reel 49 is secured by a set screw 50 for rotation with the lead screw. A chain 51 is connected at one end to the hub of the reel by the set screw 50, and is adapted to be wound upon and unwound from the reel, its other end being connected, as will hereinafter more fully appear, to the dipper of the liquid container 12, it being pointed out that upon rotation of the lead screw in clockwise direction through the driving action of the reverse gear unit 45, the reel is turned in unwinding direction to lower the dipper, and upon turning of the lead screw in counter-clockwise direction through a clutch presently to be more fully described, and which causes the lead screw to be directly connected to the drive shaft 27, the reel is turned in winding direction to elevate the dipper.

Tht reverse gear unit comprises a large bevelled gear 52 having its hub secured by a pin 53 to the shaft 27, and which meshes with a pair of diametrically opposite outer planetary bevelled pinions 54—54 disposed for free rotation upon a pair of radial shafts 55—55 carried by a cylindrical drum member 56, the outer ends of the shafts being secured by pins 57—57 in the rim of the drum member and their inner ends being secured in the hub 58 of the drum member. The hub is connected to the rim by a centrally disposed web 59 having a pair of diametrically opposite openings 60—60 therein, within which the bevelled planetary pinions 54 are disposed. Inner planetary bevelled pinions 61—61 are respectively secured to the outer planetary bevelled pinions 54—54 and mesh with a bevelled gear 62 secured upon the end of the lead screw 46 by a pin 63.

If it is assumed that the drum 56 is restrained from rotating, and at the same time the lead screw is not directly connected to the shaft 27, rotation of the shaft in counter-clockwise direction will, through the planetary pinions, rotate the bevelled gear 62 and the lead screw in clockwise direction, i. e., in reverse direction to the direction of rotation of the shaft 27. On the other hand, if it is assumed that the lead screw 46 is directly connected to the shaft 27 by the clutch means of the mechanism presently to be more fully described, and at the same time rotation of the drum is not restrained, the lead screw and the reverse gearing will rotate as a unit with the shaft 27 in the counter-clockwise direction of rotation of the shaft 27.

The base 22 is provided with a longitudinally extending clearance opening 64 disposed directly below the lead screw 46. As seen in Fig. 14, this opening extends in a generally horizontal direction but includes a forwardly extending portion 65 and a somewhat shorter rearwardly extending portion 65a transversely aligned with the portion 65, to accommodate certain parts of the clutch mechanism as will hereinafter more fully appear. Separated from the inner end of the opening 64 by a bridging portion 66 is a substantially larger clearance opening 67, which accommodates parts of a brake means cooperating with the reverse gear unit 45, presently to be more fully described.

At the forward side of the openings 64 and 67 there is secured by screws 68 a forward guide and bearing plate 69, and at the rearward side there is secured by screws 70 a rearward guide and bearing plate 71. The plates 69 and 71 are respectively provided with longitudinal guide portions 72 and 73 which project over the edges of the longitudinal portion of the opening 64, their edges being in spaced parallel relation to each other to form a guideway slot 74 for the longitudinal movement of the lead nut, indicated generally as 75, and which is engaged upon the lead screw 46, the nut including a lower shoe portion 76 disposed in the slot between the edge portions 72 and 73 of the plates 69 and 71. The detailed structure and functions of the nut will be hereinafter more fully pointed out.

At each side of the opening 67 the plates 69 and 71 are respectively provided with transversely aligned shaft bearings 77 and 78, Figs. 11, 12 and 14, in which the ends of a shaft 79 are engaged and upon which there is rotatably mounted the hub 80 of a brake member, indicated generally as 81. Adjacent the rearward end of the hub there is provided an operating lever arm 82 of bell crank form which extends longitudinally along the rearward side of the screw 46 for operation, as will hereinafter more fully appear, by means of the lead nut.

In longitudinal line with the slot 74 an arm 83 extends from the hub 80 in opposite direction from the lever arm 81, and is provided at its outer end with an upwardly projecting pocket 84 open at its lower end and engaged by the upper portion of a helical expansion spring 85 which is seated at its lower end in a U-shaped bracket portion 86 provided upon the under side of the base 22. Intermediate the hub 80 and the pocket 84 the arm 83 is provided with a downwardly extending U-shaped stirrup portion 87, in which is seated a centrally disposed downwardly projecting operating stem portion 88 of an arcuate brake shoe 89 faced with brake lining 90, and which engages the lower side of the drum member 56 of the reverse gear unit 45. Normally the pressure of the spring 85 forces the arm 83 upwardly to engage the brake shoe with the drum 56, to thus frictionally restrain rotation of the latter.

It should be pointed out that this frictional restraint is imposed during the rotation of the lead screw in clockwise direction through operation of the reverse gear unit, as well as during rotation in counter-clockwise direction when the lead screw is directly connected to the shaft 27 by the clutch means hereinafter to be more fully described. To this end the frictional restraint is of such an order that it holds the drum member 56 against rotation when the clutch is not connected between the shaft and the lead screw, so that the shaft drives the lead screw through the reverse gear unit, and permits turning of the drum member 56 when the clutch is connected between the shaft 27 and the lead screw, so that the shaft, the lead screw and the reverse gear unit rotate as a mass in counter-clockwise direction.

By raising the outer end of the lever arm 82 the brake shoe is disengaged from the drum member 56. This brake releasing action is automatically brought about at the end of each operating cycle of the mechanism at the point where the lead nut is at its extreme left hand position upon the lead screw, as seen in Fig. 5, and where the chain 51 is completely wound upon the reel in the raised position of the dipper. For the purpose of preventing a sudden stoppage of the reel at the moment when the clutch is disengaged, the releasing of the brake simultaneously with the disengagement of the clutch allows the momentum of the screw and the reel to cause the reel to continue to exert winding force on the chain, thus pulling it taut and preventing any backlash in the chain which might cause it to buckle and jam at the beginning of the next cycle.

Within the forward end of the portion 65 of the opening 64 in the base 22, and within the portion 65a, Figs. 11 and 14–17, the plates 69 and 71 are respectively provided with transversely aligned shaft bearings 91 and 92 in which the ends of a shaft 93 are engaged and upon which there is rotatably mounted the hub 94 of a clutch member, indicated generally as 95. In longitudinal line with the slot 74 the hub 94 has integrally formed therewith an outwardly extending bell crank type lever arm 96 extended upwardly through the outward end of the clearance opening 64, and provided at its upper end with a yoke portion 97, upon the inner sides of the respective side arms of which there are rotatably mounted rollers 98—98. These rollers engage the outer side of a flanged clutch member 99 keyed by means of a key 100 for longitudinal shifting movement upon the shaft 27, the inner face of the clutch member being provided with a pair of diametrically opposite V-shaped teeth 101—101 which are adapted in the engaged position of the clutch to engage with a pair of diametrically opposite V-shaped teeth 102—102 carried upon the outer face of the reel 49 to drive the latter, as well as the lead screw 46 and reverse gear unit 45, in the counter-clockwise direction of rotation of the shaft 27. In the disengaged position of the clutch the reel 49 and the lead screw 46 are rotatable relative to the shaft 27 and, as before pointed out, are driven in clockwise direction from the shaft 27 through the reverse gear unit 45.

Extending inwardly from the hub 94, and in longitudinal line with the lever arm 96, there is provided an inwardly extending clutch operating arm 103 which extends along the under side of the slot 74, and which is provided at its inner end with a latch 104 slidably engaged in a bore 105 and normally projected by means of a spring 106 disposed between the base of the bore and the inner end of the latch. A transverse pin 107 is engaged through the latch and has its ends extended through slots 108—108 at the respective sides of the arm 103, and to the ends of which there are secured latch retracting means, presently to be more fully described. The latch is adapted to engage a keeper bar 109 secured to the under side of the base across the clearance opening 64, being disposed beneath the keeper bar in the engaged position of the clutch, as seen in Figs. 11 and 16, and adapted upon retraction of the latch to move to the latch disengaging position at the upper side of the bar, as seen in Fig. 5.

The latch has a bevelled cam end 110 through which it is retracted from the clutch disengaging position, as seen in Fig. 5, through downward pressure applied upon the upper side of the arm 103, the cam face 110 engaging the edge of the bar 109 and the latch being projected beneath the bar as it clears the edge of the bar, to thus lock the clutch in clutching position. The clutch is adapted to be engaged at the end of the travel of the nut 75 as the lead screw is rotated in unwinding or clockwise direction, a cam lug 111 being provided upon the under side of the nut, and which engages a cam portion 112 provided upon the upper side of the inner end of the arm 103. Thus, when the nut moves along the lead screw from the starting position, as seen in Fig. 5, in which position the clutch is disengaged, to the position shown in Figs. 11 and 16, the cam lug 111 engages the cam portion 112 at the end of such movement to depress the arm 103 and thus engage the clutch with the reel, thereby reversing the direction of rotation of the screw and causing the nut to travel in reverse direction along the lead screw.

Without, at this point of the description, going into the details of the connection of the chain 51 with the dipper within the liquid container 12, or into a detailed description of the coin initiated start and stop means whereby the mechanism is caused to operate through a single cycle, it is pointed out that at the beginning of the cycle of operation the dipper 113 is at the top of the container 12, as seen in full lines in Fig. 4, and is in its tilted emptying position to which it was moved by contact with the upper wall portion of the container at the end of the preceding cycle of operation. At the beginning of the cycle, the dipper moves from the full line position of Fig. 4 downwardly to the bottom of the container, assuming its normal untilted position, and thereupon moves upwardly through the liquid to a point above the liquid but substantially short of the final full line position of Fig. 4, this position being shown in dot-and-dash lines in Fig. 4. It then makes another descent through the liquid, again moves upwardly to the dot-and-dash line position, then makes a third descent through the liquid and a final upward movement to the tilted position as shown in full lines in Fig. 4, in which position the contents of the dipper are emptied into the spout of the container and then flow to the cup carried in the cup dispensing apparatus 14. At this point the cycle of operation is automatically stopped. Thus, during a single cycle the dipper makes three downward movements and three upward movements, the first and second upward movements being to the dot-and-dash line position of Fig. 4 to stir or agitate the liquid prior to dispensing, and the third and final upward movement being to the top tilted position as shown in full lines to dispense the liquid.

During the descending movement of the dipper, the lead screw 46 is rotated in clockwise direction and the nut moves along the screw from the left to the right, as seen in Figs. 5, 8 and 11, Fig. 5 showing the nut in its extreme left hand position at the beginning of the cycle, and Fig. 11 showing the nut in its extreme right hand position at the end of the first descending movement of the dipper. At this point the clutch is engaged to cause the reel and the lead screw to rotate in reverse direction, i. e., in winding direction, and the nut thereupon moves along the screw from the right hand position toward the left hand position. At the end of the first and second upward movements of the dipper the reversing operation takes place short of the fully raised position of the dipper through the action of an indexing tripping mechanism carried by the nut 75, and presently to be more fully described.

Upon the forward portion of the hub 94 of the clutch 95, Fig. 15, there is rotatably mounted the hub 114 of a tripping lever 115 having at its upper end an adjustable contact screw 116 which is disposed in the path of movement of the indexing tripping means. Adjacent the forward side of the arm 103 of the clutch member there is provided a catch releasing slide 117 secured at the forwardly projected end of the pin 107 of the latch 104, and provided at its inner end with an enlarged portion having a slot 118 engaged by the hub 94 between the arm 103 and the inner end of the hub 114 of the tripping lever 115, this slot being open at its end toward the latch to an enlarged cam opening 119, and in which is engaged a cam 120 carried upon the inner end of the hub 114 of the tripping lever.

In the projected position of the latch, Fig. 16, the spring 106 draws the slide 117 toward the right to force the vertically disposed side of the opening 119 against the vertical side of the cam 120. When the lever 115 is pressed in counter-clockwise direction, it rotates the cam 120 and thus moves the slide 117 to the left, causing the latch 104 to be retracted so that it will release from the keeper 109. At the same time, the counter-clockwise pressure of the cam 120 as it presses against the upper portion of the vertical side of the cam opening 119 causes the clutch member to tilt in counter-clockwise direction, thus disengaging the clutch 99 from the reel 49.

The indexing tripping means carried by the nut 75 comprises an indexing plate 121 pivotally mounted by a pivot screw 122 upon the forward face of the nut 75. The indexing plate carries a plurality, six as shown, of circumferentially arranged equally spaced forwardly projecting pins 123, and at its rearward side is provided intermediate the pins with a series of detent pockets 124 which are adapted to be successively engaged by a detent spring pressed ball 125 carried in a pocket 126 provided in the outer face of the nut, and which releasably retains the plate in its operative positions.

The plate 121 is provided with six peripheral faces 127, 128, 129, 130, 131 and 132, the faces 129 and 132 being diametrically opposite each other and relatively long in length and being spaced a substantially shorter distance from the pivot axis than the faces 127, 128, 130 and 131, which latter faces are substantially short in length. The plate is adapted to be intermittently rotated to successively present the faces in operative relation at the end of each movement of the nut to the right hand position, and for this purpose an indexing finger 133 is pivotally mounted in a bracket 134 secured to the base 22. This finger is provided with an inclined cam edge 135 adapted, as the nut moves from the left hand position to the right hand position, to engage one of the pins 123 to index the plate through one-sixth of a revolution, the detent ball 125 being forced out of one of the pockets at the beginning of this indexing operation and dropping into the next pocket at the end of the operation.

At the beginning of a cycle of operation of the mechanism, the plate is in the position as seen in Fig. 5, with one of the long faces 129 or 132 in the vertically disposed operating position at the left hand edge of the nut, the face 132 being shown in this position. It is pointed out that during each operating cycle three of the faces of the plate are brought into operation, for instance, during one operating cycle the short faces 127 and 128 and the long face 129 operate for one cycle, and the short faces 130 and 131 and the long face 132 operate for the next cycle.

As shown in Fig. 5, the face 132 is in the operative position to which it had moved at the end of the previous cycle of operation. At the start of the cycle, the nut moves to the right from the position shown in Fig. 5 to the position shown in Fig. 11, and the indexing plate 121 is caused, through engagement with the finger 133, to rotate to bring the face 127 into operative position, as shown in Fig. 11. As the nut moves to the left, from the full line position to the dot-and-dash line position, the face 127 engages the tripping lever 115 causing the latch 104 to be retracted and the clutch to be disengaged, so that the lead screw then rotates in reverse direction through the reverse gear unit 45. Because the short faces of the plate are at a greater distance from the rotation axis than the long faces, the lever 115 is tripped at a point substantially short of the full travel of the nut upon the lead screw to the left, so that the reversing operation takes place before the reel brings the dipper to the full top position, i. e., it reverses at the partially raised position as shown by the dot-and-dash lines in Fig. 4.

During the second travel to the right of the nut upon the screw, from the position shown in dot-and-dash lines in Fig. 11 to the full line position, the plate 121 is indexed by the finger 133 to bring the second short face 128 into operative position, so that the following travel of the nut to the left is also short of its full travel and again trips the lever 115 to disengage the clutch. During the third travel of the nut to the right, the plate 121 is indexed by the finger 133 to bring the long face 129 into operative position so that during the following travel of the nut to the left, it is permitted to travel its full distance, i. e., to the position as shown in Fig. 5 where the dipper is moved to its top tilted position, as shown in Fig. 4, and the cycle of operation is automatically stopped by stop means presently to be more fully described. Upon occasion, or, for instance, when it is desired to rapidly dispense the liquid without the necessity for the complete agitation action, the indexing mechanism may be immobilized so that the dipper makes only one downward and upward movement during each cycle. For this purpose the finger 133 is simply swung to the inoperative position shown by dot-and-dash lines in Fig. 5.

At the rearward side of the arm 103 of the clutch member 95 there is provided a latch releasing slide 136 connected at its outer end to the rearwardly projected end of the pin 107 of the catch 104, and provided with an enlarged inner end portion having a slot 137 engaged by the hub 94 of the clutch member between the arm 103 and the bearing 92, as seen in Fig. 15. An upwardly projecting inclined cam 138 is provided upon the enlarged end of the slide 136 and is engaged by a cam finger 139 pivotally mounted upon a pin 140 supported at its ends in bracket lugs 141 carried upon the guide plate 71. This cam carries an operating arm 142 which is disposed in the path of and adapted to be operated by the coupling connecting the chain 51 to the dipper in the fully raised position of the dipper, as will presently more fully appear. Thus when the dipper is allowed to move to its fully raised position through the full movement of the nut 75 toward the left, by reason of one of the long faces of the indexing plate 121 being in operative position, the cam finger 139 is depressed to engage the cam 138 of the slide 136 to thus retract the latch 104 to cause the clutch member to be released and moved to its clutch releasing position. This action occurs simultaneously with the stopping of the mechanism at the end of a cycle, and which stopping action will be hereinafter more fully described.

The base 22 is provided at a point in line with the central vertical plane of the reel 49 with a circular opening 143 and a cylindrical housing member 144 is secured upon the base 22 in register with this opening. A flanged closure cap 145 is seated in the upper open end of the housing 144, being restrained against rotation by means of a peripheral lug 146 engaged in a notch opening 147 in the upper end of the housing, and through which the chain 51 extends from the reel. Upon the under side of the cap 145 a roller 148 is rotatably mounted between a pair of lugs 149—149, the chain 51 being trained over this roller and extending vertically downwardly where its end is secured by a set screw 150 to a coupling member 151 through which the chain is connected to the dipper. This coupling member is movable in an elongated cylindrical tube 152 which extends between the housing 144 of the operating mechanism and the upper mouth end of the liquid container 12.

As seen in Fig. 23, the tube 152 is slidably fitted at its upper end in the housing 144 and is retained therein by means of a set screw 153 engaged in a slot 154 of the tube, and which permits the tube to be slidably moved upwardly from the position shown in Fig. 23 during removal or installation of a container, as will presently more fully appear.

The coupling includes an upper head portion 155 of circular outline and fitted for sliding movement within the tube 152, and below this head portion is provided with a coupling portion 156 to which the rod 157 carrying the dipper 113 is adapted to be secured. The tube 152 is provided at its lower end with an inwardly curled retaining rim or bead 158 which, in the lower position of the dipper, is engaged by the upper head portion 155 of the coupling so as to limit its downward movement, the lower coupling portion 156, however, being of less diameter than the head portion so that it is permitted to move below the lower end of the tube.

A sleeve 159 is slidably engaged upon the lower end of the tube 152 and in its lower or closed position seats upon the upper end of the container 12, being slidable upwardly upon the sleeve to allow access to the coupling for the purpose of removing or installing the liquid containers. It is also pointed out that during this operation the tube 152 may be moved upwardly in the housing 144 where it may be retained by means of a grip collar 160 mounted upon the lower side of the frame support 21, and in which the tube is positioned, this grip collar being of split spring type and adapted to be tightened or released with respect to the tube by means of a thumb screw 161, Fig. 5.

As above pointed out, the container 12 and the dipper assembled therewith is of the type as disclosed in our co-pending application Serial No. 501,559, wherein a single use bellows-type seal 162, of paper or the like, is provided about the dipper rod 157 so that as the rod moves upwardly or downwardly the seal is extended or retracted. The container is adapted to be delivered by the dairy or the like in the sealed condition as shown in Fig. 3, with removable sealing caps 163 and 164 engaged over the upper mouth end and the spout. As clearly shown in Fig. 21, the seal extends over the upper grooved end 165 of the rod which is adapted, after removal of the cap 163 and slight lifting of the rod from the mouth of the container, to be connected to the coupling by means of a locking pin 166 rotatable between locking and unlocking positions through the operation of a lever 167. In the locked position, this lever is vertically disposed as shown in Figs. 21—23, and when confined in the tube 152 and the sleeve 159 it is held against accidental movement to an unlocked position, it being necessary in order to unlock it that it be exposed below the tube 152 through raising the sleeve 159.

The operating mechanism also includes a means for automatically operating the cup dispensing device 14 to dispense one cup at the beginning of each operative cycle. The cup dispensing device includes vertically disposed cup retaining and releasing screws 168, Fig. 2, which are so arranged that when rotated a given amount they release a single cup, this rotation being brought about by suitable gearing including a pinion gear 169, so disposed that when the door 13 of the cabinet is closed it meshes with a driving gear 170 carried by the operating mechanism. The gear 170 is secured upon the lower end of a vertical shaft 171, Fig. 5, having bearing in a tubular post 172 secured at the under side of the forward portion of the base 22, the shaft extending upwardly through the base where it is secured by a pin 173 to the hub 174 of a circular ratchet plate 175 rotatably seated upon the upper side of the base.

The ratchet plate is provided with a series of circumferentially spaced ratchet teeth 176 adjacent the periphery, arranged to be engaged by the tooth of a weighted pawl 177 pivotally mounted by a pin 178 upon the forward side of the nut 75. The gear 170 is preferably enclosed in a circular housing 179 having an opening 180 at its forward side, into which the pinion 169 moves into mesh therewith upon closing of the door 13.

The travel of the nut and the arrangement of the ratchet teeth are so related that, while the nut travels three times to the right and three times to the left along the lead screw during a single cycle, the ratchet plate is only indexed once during the cycle. The arrangement is shown clearly in Fig. 10 wherein the full lines illustrate the position of the ratchet plate at the beginning and end of a cycle. During the initial travel of the nut to the right, the pawl 177 rides over the ratchet tooth 176 disposed in its path, shown at the top in Fig. 10, to a point spaced to the right of the tooth, this being the full line position of the pawl indicated as $a$.

As above pointed out, the first and second movements of the nut to the left are short movements, and the third and final movement to the left is a long one. The extent to the left of the short movements is indicated by the dot-and-dash line position $b$ of the pawl, in which position the ratchet plate is moved to the position indicated in dot-and-dash lines, this movement being sufficient to actuate the cup dispenser to release one cup. Thus at the end of the second and third movements of the nut to the right, i. e., to the position $a$ of the pawl, the pawl rests upon the upper side of the ratchet tooth in its path so that the rachet plate will not be actuated during the second short movement of the nut to the left. However, during the third or final long movement of the nut to the left, the pawl moves to the position $c$ bringing the ratchet plate again to the full line position and moving clear of the ratchet tooth with which it engaged during this final movement, so that the ratchet plate is in its original position for the start of the next cycle.

The chain housing 144 is provided at its lower end with a mounting base 181 in the form of an equilateral triangle, having one side parallel to the axis of the lead screw 46, and in spaced relation above the three projecting portions of this base there are integrally formed upon the housing three bearing lugs 182, 183 and 184, fastening screws 185 being engaged downwardly through the bearing lugs and the base projections and screwed in the base 22 to secure the housing, these screws also serving as pivot pins for certain operating parts of the start and stop means, as will presently more fully appear.

Between the bearing lug 182 and the base there is pivotally mounted upon the screw 185 a brake actuating lever 186 urged in clockwise direction by a spring 187 seated in a pocket formation 188 provided upon the lever and bearing in a recess 189 in the side of the housing. The lever has three arms 190, 191 and 192, the arm 191 being arranged, as will presently more fully appear, for manual operation, the arm 192 being arranged for automatic operation, and the arm 190 being provided at its projecting end with a cam lug 193 for cooperation with a brake actuating plate 194 pivotally mounted upon the rearward side of the nut 75 by means of a screw 195.

The brake actuating plate 194, Fig. 13, is provided at its upper edge with a movement limiting stop flange 196 for engagement with the upper side of the nut, and is provided at its lower end with a cam lug 197 laterally projected beneath the lever arm 82 of the brake member 81. Upward swinging movement of the brake actuating plate to the position as shown in Fig. 13 lifts the end of the arm 82 and thus releases the brake shoe 89 from engagement with the drum 56 of the reverse gear unit 45. In the lowered position of the brake actuating plate, as shown in Fig. 11, the arm 82 swings downwardly and the brake shoe is engaged under the pressure of the spring 85. The brake actuating plate is adapted to be held in raised position through engagement of the cam lug 197 with the cam lug 193 of the lever 186 when the latter is in its normal position, as shown in Figs. 8 and 18, this being the normal stopped position of the mechanism, with the nut in its full travel position to the left.

It is pointed out at this point that at the beginning of an operative cycle the lever 186 is actuated to a release position, as shown in Fig. 19, to disengage the cam lug 193 from the cam lug 197 of the brake actuating plate 194, allowing the plate to drop to its downward position and causing the brake shoe to be applied to the drum of the reverse gear unit 45. During the short travel periods of the nut to the left, i. e., to the position shown by the dot-and-dash lines in Fig. 11, the cam lug 197 does not reach the cam lug 193 of the lever 186 so that the brake shoe remains applied to the drum, but at the end of the long travel period, which takes place at the end of the cycle, the cam lug 197 rides up on the cam lug 193 disposed in its path, and thus moves the brake actuating plate 194 to its raised position, which in turn raises the arm 82 to its brake shoe releasing position, as shown in Fig. 13.

The coupling head 155, at the beginning and end of a cycle, is in the raised position within the chain housing 144, as seen in Figs. 18, 22 and 23, and in this position it is engaged at its upper side by the end of the actuating arm 142 of the cam lever 140, which arm is extended through a clearance opening 198 of the chain housing 144, the movement of the coupling head at the end of an operating cycle to its raised position engaging the actuating arm 142 and thus actuating the cam lever 140 to cause the latch actuating slide 136 to be retracted, thus releasing the latch pin 104 from the keeper bar 109 and moving the clutch member 95 to its clutch releasing position. Also, in the raised position of the coupling head at the end of a cycle, it cooperates with a latching means which is adapted to releasably retain the coupling in its raised position and with a switch actuating means which is adapted to actuate a switch to stop the driving motor and thus end the cycle of operation.

In a line substantially at right angles to the right hand side of the triangular chain housing base 181 of the chain housing 144, and spaced to the right, a solenoid unit 199 is secured to the base 22, the armature 200 of this unit being normally spring pressed to its projected position as seen in Fig. 18, and adapted to be retracted upon energizing of the solenoid. The armature has secured to it, by means of brackets 201—201, an actuating arm 202 which, in the projected position of the armature, engages against the side of the chain housing 144 as seen in Fig. 18. As will presently more fully appear, this arm carries certain parts which actuate elements of the start and stop mechanism.

Forwardly of the solenoid 199 a switch unit 203 is secured to the base 22 and is provided with an operating plunger 204 normally spring-pressed outwardly. This switch, as will hereinafter more fully appear, is connected to the motor 34 and is of a type which is normally closed, i. e., it is closed when the plunger 204 is fully projected but is open when it is depressed.

A switch actuating lever 205 is pivotally mounted upon the base 22 by a pivot stud 206 and includes an upstanding flange 207 along one edge of its horizontal base which engages the plunger 204, and an upstanding flange 208 along its opposite edge which at its outer end is projected beyond the horizontal base into an upwardly offset contact finger 209. An arm 210 extends laterally from the flange 208 and is provided at its outer end with an upwardly and outwardly inclined cam finger portion 211 extending through a clearance opening 212 in the chain housing 144, where it is engaged with the periphery of the coupling head 155 in the raised position of the latter at the beginning and end of an operating cycle. When so engaged by the coupling head, the switch actuating lever 205 is in a position as seen in Fig. 18 to depress the plunger 204, so that the switch 203 is open. The lever 205 is spring pressed toward the chain housing by a hairpin spring 213 having its coil end secured at the underside of the base 22 by a screw 214, one arm being engaged with the end of a slot 215 in the base 22 while its other arm is provided with a bent retaining finger 216 engaged through the slot with the edge of the switch actuating lever 205.

A coupling latching lever 217 has its hub pivotally engaged between the rearwardly disposed bearing lug 184 of the chain housing 144 and the base flange 181 upon the screw 185, and includes a switch lever actuating arm 218 extending in a generally parallel relation to the switch actuating lever over the arm 210 thereof and in opposed relation to the flange 208 thereof. It also includes a latching arm 219 normally extended through the clearance opening 212 of the chain housing and which, as shown in Fig. 23, has a lower inclined camming edge 220 adapted when disposed in the path of the coupling head 155 as the latter moves upwardly to its top position, to be engaged to swing the lever in counter-clockwise direction, and provided at its upper side with a flat edge 221 adapted when the coupling head 155 moves above it, to engage the underside of the head through clockwise return movement of the lever to thus retain the coupling head in its raised position. The latching lever 217 also includes a third arm 222 projecting to the left hand side of its hub, and provided with a contact head 223 for engagement by a manually operable means, the purpose and form of which will hereinafter more fully appear.

Upon the right hand side of the chain housing, adjacent the bearing portion 184, there are provided a pair of spaced bracket ears 224 and 225 supporting a pivot pin 226 upon which is pivotally mounted a switch lock member 227, the horizontal pivot axis being at a right angle to the direction of movement of the actuating arm 202 of the solenoid armature 200. In the normal position of this member, as seen in Figs. 18 and 23, a movement limiting lug 228 projecting laterally from its top rests upon the bearing ear 224 and when swung upwardly from this normal position as seen in Fig. 19, by the actuation of means presently to be described, it returns by its own weight to the normal position when such lifting means is disengaged therefrom.

As seen in Fig. 23, this member includes a forward edge surface 229 which, at the start or end of a cycle, is in laterally opposed spaced relation to the finger end 209 of the switch lever 205, so that it forms a stop to prevent swinging movement of the switch lever to a point where the plunger 204 of the switch 203 would be fully projected and the switch closed. It also includes a bottom edge surface 230 which, when the switch locking member is swung to a raised position as seen in Fig. 9, is engaged by the upper edge of the finger 209 of the switch lever, permitting the switch lever to move to a switch closing position, as indicated by the dot-and-dash lines in Fig. 19, this operation taking place, as will presently more fully appear, following the initial downward movement of the coupling head 155. The switch lock member is also provided at its under side with a cam lug 231, through which it is adapted to be moved to its lifted position as will presently more fully appear.

Upon the forward side of the actuating arm 202 of the armature 200, there is provided a laterally extending diagonally extending finger 232 which extends below the arm 192 of the brake actuating lever 186 and has its diagonal edge opposed to a downwardly extending finger 233 upon the end of the arm 192. On the under side of the finger 232 there is provided a downwardly projecting lug 234 which is laterally opposed to the arm 218 of the latch lever 217. Upon the opposite side of the actuating arm 202 from the finger 232, there is provided an inclined cam lug 235 disposed in opposed relation to the cam lug 231 of the switch lock member 227. Also carried by the arm 202 at the same side as the cam lug 235 is a switch actuating finger 236 which is laterally opposed to the end of the actuating leaf 237 of a microswitch 238 mounted upon the base 22. This microswitch is a motor starting switch and is normally open, being closed through depression of the leaf 237.

Also mounted upon the base 22 is a motor stopping switch 239 having an actuating leaf 240, the end of which is disposed in the path of right hand travel of the nut 75, a contact portion 241 carried upon the nut being adapted, as the nut reaches the end of its right hand travel, to depress the leaf 240 to actuate the switch 239. As shown in the electrical diagram, Fig. 9, this switch is a two circuit switch, one circuit being normally closed and one normally open, the normally closed circuit being connected to the motor and being opened when the nut reaches the end of its right hand travel and depresses the lever 240. The normally open circuit is connected to a solenoid 242 of a coin receiving unit, part of which is shown in Figs. 6 and 7, and which is adapted upon the insertion of a coin in the coin slot of the machine to start an operative cycle. This unit includes a coin receiving tube 243 at one side of which a microswitch 244 is mounted, the actuating arm 245 of this switch having a right angularly bent finger 246 at its end which extends through arcuate slots 247 in the side walls of the tube 243 across the path of a coin dropping downwardly through the tube. A coin retainer lever 248 is pivotally mounted at the side of the tube 243 upon a pin 249 and is provided at its lower end with a ledge portion 250 normally disposed below the end of the tube 243, being retained in this position by a stop flange 251 at one edge.

The lever 248 is connected by a pivot connection 252 to the armature 253 of the solenoid 242, so that when the solenoid is energized and the armature pulled upwardly, the lever is pivoted to swing the ledge 250 from beneath the end of the tube 243 to release a coin resting thereon. As clearly shown in Fig. 6, the arm 245 of the microswitch, in its horizontal position as shown in full lines, is spaced at its end from the end wall of the tube 243 a distance substantially less than the diameter of the coin 254, so that as the coin drops it carries the arm downwardly to the dot-and-dash line position which closes the circuit of the microswitch. In this position the coin rests upon the ledge 250 of the releasing lever 248 with its ledge against the end wall of the tube, the finger end 246 of the arm 245 being engaged with the edge at a diametrically opposite point from the point of engagement with the end wall, so that as long as the coin is held in this position by the ledge 250 the arm 245 of the switch is prevented from returning to its normal switch opening position.

Upon energizing of the solenoid the ledge 250 is swung clear of the end of the tube 243 so that the coin drops and releases the switch arm 245, which thereupon moves to its normal horizontal position thus opening the switch. The microswitch 244 is connected to the solenoid 199 so that the latter is energized when the switch is closed, and the solenoid 242 is connected to the normally open circuit of the two circuit switch 239, so that when this switch is operated at the end of the right hand travel of the nut 75 the normally open circuit is closed simultaneously with the opening of the normally closed motor circuit and the solenoid 242 is energized to release the coin and effect opening of the microswitch 244.

As is clear from the electrical diagram in Fig. 9, the circuit to the motor 34 may be closed by actuation of the switch 238 to closed position, and opened by actuation of the motor connected circuit of the switch 239 from its normally closed to its open position. It may also be closed or opened independently through actuation of the switch 203.

The operation of the automatic start and stop mechanism is as follows: At the beginning of the cycle the parts are in the positions shown in Fig. 18. Upon dropping of a coin in the tube 243, as seen in Fig. 6, the microswitch 244 is closed causing the solenoid 199 to be energized, whereupon the armature 200 is retracted to the position shown in Fig. 19 causing the actuating arm 202 to simultaneously perform the following functions: (1) It swings the brake actuating lever 186 from the brake releasing position, as seen in Fig. 18, to the brake applying position shown in Fig. 19, through the movement of the finger 232 in engagement with the finger 233 of the arm 192; (2) the finger 236 engages the leaf 237 of the microswitch 238, closing the latter and causing the motor to start, whereupon the nut 75 starts its travel in chain unwinding direction to the right; (3) the coupling latching lever 217 is swung in counterclockwise direction to disengage its latching finger 219 from beneath the coupling head 155, so that the latter is free to move downwardly, this operation being brought about through engagement of the lug 234 with the arm 218 of the latching lever; (4) the arm 218 as it swings in counter-clockwise direction engages the flange 208 of the switch lever 205, moving it to the full line position clear of the switch lock member 227, as seen in Fig. 19; and (5) the cam lug 235 of the actuating arm 202 engages beneath the cam lug 231 of the switch lock member, lifting it to the raised position as seen in Fig. 19.

As the motor circuit is closed and the circuit of the solenoid 199 is simultaneously closed, the parts remain in this position as the nut travels to the right, and the coupling and dipper are lowered through unwinding of the chain. As soon as the nut reaches its right hand position the contact portion 241 depresses the leaf 240 of the two-circuit microswitch 239 from the full line to the dotted line position as seen in Fig. 20, which simultaneously opens the circuit to the motor and closes the circuit to the solenoid 242 of the coin receiving unit, causing the ledge 250 of the lever 248 to move to release the coin and allowing the microswitch 244 to move to its normally open position which opens the circuit to the solenoid 199, so that the armature 200 is released and the parts held by the actuating arm 202 move from the full line position as seen in Fig. 19 to the dot-and-dash line position. Thus, as the switch lock member 227 is in its raised position as the switch lever 205 is released, the latter moves under the switch lock member, permitting the plunger 204 of the switch 203 to move to its fully projected switch closing position. Thus simultaneously with the opening of the motor circuit through actuation of the switch 239 at the end of the right hand travel of the nut 75, the motor circuit is closed through actuation of the switch 203, so it then continues to operate throughout the completion of the cycle.

During such cycle, as above pointed out, the coupling head 155 and the dipper make three downward and three upward movements, the first and second upward movements being short of the full upward movement, and the third upward movement being the full upward movement. At this point the coupling head has moved upwardly past the latching arm 219 of the latching lever 217, first moving it out through engagement of its periphery with the cam edge 220, and then allowing the flat edge 221 to move beneath it to retain the coupling in raised position. At the same time its periphery has also engaged the cam finger 211 of the switch lever 205 swinging it outwardly from beneath the switch lock member 227 to the position shown in Fig. 18, where the motor switch 203 is opened to stop the motor. Also, at the same time, the coupling head engages and lifts the arm 142 of the cam lever 140, thus depressing its cam portion 139 and retracting the latch releasing slide 136, thereby causing the clutch member 95 to be disconnected from the reel 49.

When a liquid container 12 is to be removed from the cabinet, or installed, it is necessary that the coupling be immobilized at the lower end of its downward movement. For this purpose manual means are provided for effecting operation of the mechanism to cause the coupling to be moved from its normal position as seen in Fig. 18 to its lower position and thereupon stopped. Between the bearing lug 183 and the base 181 of the chain housing, there is pivotally mounted upon the screw 185 the hub of a lever 255 which is normally disposed in back of the end of the manual actuating arm 191 of the brake actuating lever 186, a stop lug 256 on the forward side of the lever 255 being engaged with the forward side of the base 181 to limit the inward movement of the lever. The lever is provided with an operating arm 257 which is extended along the left hand side of the housing to a point where its end is directly above the contact head 223 of the latch lever 217. A vertical post 258 has bearing in a bearing boss 259 in the base 22 and is provided at its lower end with an operating handle 260 and at its upper end with an actuation bar 261. At one end this bar is provided with a switch actuating portion 262 and at its other end is provided with a lever actuating portion 263.

With the parts in the normal stop position as seen in Fig. 18, the manual actuating means is operated by moving the handle 260 to the position as seen in Fig. 20. In this position the motor starting switch 238 is closed by contact of the end 262 of the bar 261 with the switch leaf 237, the latch lever 217 is swung to a coupling releasing position through contact of the end 263 with the contact portion 223 of the lever, and the switch lever 205 is moved by means of the arm 218 of the latch lever 217 to the position shown in full lines in Fig. 20. At the same time the brake actuating lever 186 is moved to the release position as seen in Fig. 20, through contact of the end 263 of the bar 261 with the arm 257 which swings the lever 255 outwardly to in turn swing the lever 186 to its release position. Thus the motor is started and continues to operate as long as the parts are retained in the position as shown in full lines in Fig. 20.

As the nut 75 reaches the end of its right hand movement, at which point the coupling is in its lowered position, it engages and depresses the leaf 240 of the switch 239 opening the motor circuit and stopping the motor. The handle 260 is now released, at which point the switch lever 205 moves to the dot-and-dash line position against the abutment surface 229 of the switch lock member 227, this position being short of the switch closing position. The coupling will remain in the lowered position until the machine is again actuated by the insertion of a coin, whereupon the mechanism operates to complete the normal cycle.

The tube 152, Figs. 22 and 23, is provided with clearance slots 264 and 265, open at their upper ends, and which register with the clearance openings 198 and 212 of the chain housing, so that during removal or installation of a container the tube may be slid upwardly in the housing without obstructing the clearance openings.

It will be seen from the foregoing description of the operation of the mechanism that the head 155 of the coupling member 151 constitutes a first actuating part, and that the nut 75 constitutes a second actuating part, through which the various operations of the mechanism are controlled.

What is claimed is:

1. In a dispensing apparatus, a reciprocating dispenser, dispenser operating means for reciprocating said dispenser, a motor connected to drive said dispenser operating means, an actuating part having reciprocating movement with said dispenser and having a normal start and stop position at one end of its reciprocating movement and a direction reversing position at the other end of its reciprocating movement, a normally open motor start switch connected in the motor circuit adapted upon closing to start the motor, a normally closed motor start and stop switch connected in the motor circuit, switch operating means for said motor start and stop switch engaged by said actuating part in its normal start and stop position to open said motor start and stop switch, movement of said actuating part from its normal start and stop position adapted to permit movement of said switch operating means to a position to close said start and stop switch.

2. In a dispensing apparatus, a reciprocating dispenser, dispenser operating means for reciprocating said dispenser, a motor connected to drive said dispenser operating means, a first actuating part having reciprocating movement with said dispenser and having a normal start and stop position at one end of its reciprocating movement and a direction reversing position at the other end of its reciprocating movement, a second actuating part driven by said dispenser operating means having reciprocating movement simultaneously with and directly proportional to the reciprocating movement of said first actuating part, and having a normal start and stop position at one end of its reciprocating movement and a direction reversing position at the other end of its reciprocating movement, a normally open motor start switch connected in the motor circuit adapted upon closing to start the motor, a normally closed motor start and stop switch connected in the motor circuit, switch operating means for said motor start and stop switch engaged by said first actuating part in its normal start and stop position to open said motor start and stop switch, movement of said first actuating part from its normal start and stop position adapted to permit movement of said switch operating means to a position to close said start and stop switch, a normally closed motor stop switch connected in the motor circuit, and contact means carried by said second actuating part adapted to open said motor stop switch at the end of the initial movement of said second actuating part to its direction reversing position.

3. The invention as defined in claim 2, further characterized my manually operable means for closing said motor start switch, and a lock member disposed in the path of switch closing movement of said switch operating means to prevent closing of said motor start and stop switch upon movement of said first actuating part from its normal start and stop position.

4. The invention as defined in claim 2, further characterized by a normally open coin actuated switch, means operated upon closing of said coin actuated switch to close said motor start switch, a coin retaining and releasing means adapted to retain a coin in position to maintain said coin actuated switch closed and to release said coin to open said coin actuated switch, a solenoid including an armature connected to said coin retaining and releasing means adapted upon being energized to move said means to coin releasing position, and a normally open solenoid actuating switch adapted to be closed by said contact means at the end of the initial movement of said second actuating part to its direction reversing position.

5. The invention as defined in claim 2, further characterized by a solenoid including an armature adapted upon energizing of said solenoid to close said motor start switch, and a normally open operation-initiating start switch connected in the solenoid circuit.

6. The invention as defined in claim 2, further characterized by a solenoid including an armature adapted upon energizing of said solenoid to close said motor start switch, a normally open coin actuated switch connected in the circuit of said solenoid, a coin retaining and releasing means adapted to retain a coin in position to maintain said coin actuated switch closed and to release said coin to open said coin actuated switch, a second solenoid including an armature connected to said coin retaining and releasing means adapted upon being energized to move said coin retaining and releasing means to coin releasing position, and a normally open solenoid actuating switch for actuating said second solenoid adapted to be closed by said contact means at the end of the initial movement of said second actuating part to its direction reversing position.

7. The invention as defined in claim 2, further characterized by a latching member adapted to be engaged in latching relation with said first actuating part to retain it in its normal start and stop position, a solenoid including an armature, and actuating means carried by said armature adapted upon energizing of said solenoid to move said latching member out of latching relation with said first actuating part.

8. The invention as defined in claim 2, further characterized by manually operable means for closing said motor starting switch, a lock member disposed in the path of switch closing movement of said switch operating means to prevent closing of said start and stop switch upon movement of said first actuating part from its normal start and stop position, a latching member adapted to be engaged in latching relation with said first actuating part to retain it in its normal start and stop position, a solenoid including an armature, and actuating means carried by said armature including means adapted upon energizing of said solenoid to move said latching member out of latching relation with said first actuating part and to move said lock member to a non-locking position, whereby when said first actuating part is removed from its normal start and stop position and said solenoid is de-energized, said switch operating means is permitted to move to a position to close said motor start and stop switch.

9. In a dispensing apparatus, a reciprocating dispenser, dispenser operating means movable first in one direction and then in the opposite direction for reciprocating said dispenser, a motor, a shaft driven by said motor, a reverse gear means connected to said shaft for moving said dispenser operating means in said one direction, a clutch connected to said shaft for moving said dispenser operating means in said opposite direction, an actuating part driven by said dispenser operating means having reciprocating movement simultaneously with and directly proportional to the reciprocating movement of said dispenser, and having a normal start and stop position at one end of its reciprocating movement and a direction reversing position at the other end of its reciprocating movement, clutch operating means for releasing said clutch in said normal start and stop position of said actuating part, brake means for said reverse gear means, and brake actuating means carried by said actuating part adapted in its said normal start and stop position to release said brake means and adapted to effect application of said brake means when said actuating part is removed from said normal start and stop position.

10. The invention as defined in claim 9 further characterized by a reel connected to said dispenser operating means, and a flexible connection means connected between said dispenser and said reel, adapted to be unwound from said reel upon movement of said dispenser operating means in said one direction and to be wound upon said reel upon movement of said dispenser operating means in said opposite direction.

11. The invention as defined in claim 9, further characterized by a normally open motor start switch connected in the motor circuit adapted upon closing to start the motor, a solenoid including an armature adapted upon energizing of said solenoid to close said motor start switch, a normally open operation-initiating start switch connected in the solenoid circuit, a brake actuating member arranged to actuate said brake actuating means in said normal start and stop position of said actuating part, and means carried by said armature adapted upon energizing of said solenoid to move said brake actuating member to brake applying position.

12. The invention as defined in claim 9, further characterized by a normally open motor start switch connected in the motor circuit adapted upon closing to start the motor, a solenoid including an armature adapted upon energizing of said solenoid to close said motor start switch, a normally open operation-initiating start switch connected in the solenoid circuit, a brake actuating member arranged to actuate said brake actuating means in said normal start and stop position of said actuating part, means carried by said armature adapted upon energizing of said solenoid to move said brake actuating member to brake applying position, manually operable means for closing said motor start switch, and means adapted to be actuated by said manually operable means to move said brake actuating member to brake applying position.

13. In a dispensing apparatus, a reciprocating dispenser, dispenser operating means for reciprocating said dispenser, a motor, a shaft driven by said motor, a reverse gear means connected to said shaft for moving said dispenser operating means in said one direction, a clutch connected to said shaft for moving said dispenser operating means in said opposite direction, an actuating part having reciprocating movement with said dispenser and having a normal start and stop position at one end of its reciprocating movement and a direction reversing position at the other end of its reciprocating movement, and clutch releasing means actuated by said actuating part at the end of its movement to said normal start and stop position.

14. In a dispensing apparatus, a reciprocating dispenser, dispenser operating means for reciprocating said dispenser, a motor, a shaft driven by said motor, a reverse gear means connected to said shaft for moving said dispenser operating means in said one direction, a clutch connected to said shaft for moving said dispenser operating means in said opposite direction, a first actuating part having reciprocating movement with said dispenser and having a normal start and stop position at one end of its reciprocating movement and a direction reversing position at the other end of its reciprocating movement, a second actuating part driven by said dispenser operating means having reciprocating movement simultaneously with and directly proportional to the reciprocating movement of said first actuating part, and having a normal start and stop position at one end of its reciprocating movement and a direction reversing position at the other end of its reciprocating movement, a first clutch releasing means, indexing means carried by said second actuating part adapted to actuate said first clutch releasing means at a point in the movement of said second actuating part toward its normal start and stop position short of said position, and clutch releasing means actuated by said first actuating part at the end of its movement to its said normal start and stop position.

15. In a dispensing apparatus, a reciprocating dispenser, dispenser operating means movable first in one direction and then in the opposite direction for reciprocating said dispenser, a motor connected to drive said dispenser operating means, an actuating part driven by said dispenser operating means having reciprocating movement simultaneously with and directly proportional to the reciprocating movement of said dispenser, and having a normal start and stop position at one end of its reciprocating movement and a direction reversing position at the other end of its reciprocating movement, a pawl carried by said actuating part, a rotatably mounted cup dispenser actuating ratchet plate having a series of circumferentially spaced ratchet teeth adapted through rotation of said plate to be successively brought into operative relation with the path of movement of said pawl, indexing means carried by said actuating part adapted to reverse the direction of movement of said actuating part at a point in its movement toward its said normal start and stop position short of said position, said pawl during such movement adapted to move one tooth in its path through a partial increment of movement and upon reverse movement to said direction reversing position to be positioned short of engaging relation with the successive tooth.

16. In a dispensing apparatus, a reciprocating dispenser, dispenser operating means movable first in one direction and then in the opposite direction for reciprocating said dispenser, a motor connected to drive said dispenser operating means, a flexible connection member connected at one end to said dispenser operating means, a coupling member at the other end for connection to said dispenser, a vertical guide tube for said coupling having a retaining means at its lower end defining an open lower tube end of less diameter than the internal diameter of said tube, said coupling including an upper head portion slidable in said tube and of greater diameter than said lower tube end and a lower coupling portion of less diameter than said tube end.

References Cited in the file of this patent
UNITED STATES PATENTS

| | | |
|---|---|---|
| 2,552,856 | Knapp | May 15, 1951 |
| 2,556,739 | Polsen et al. | June 12, 1951 |
| 2,571,283 | Nicholson | Oct. 16, 1951 |
| 2,610,722 | West | Sept. 16, 1952 |
| 2,744,672 | Crist | May 8, 1956 |